United States Patent

[11] 3,619,256

| [72] | Inventors | Anthony Enrico Pepe<br>Sylvania, Ohio;<br>Charles George Neuroth, Blissfield, Mich. |
|---|---|---|
| [21] | Appl. No. | 780,255 |
| [22] | Filed | Nov. 29, 1968 |
| [45] | Patented | Nov. 9, 1971 |
| [73] | Assignee | Stauffer Chemical Company<br>New York, N.Y. |

[54] SILICONE RUBBER COATED SUBSTRATES AND A METHOD FOR BONDING SILICONE RUBBER THERETO
9 Claims, No Drawings

[52] U.S. Cl............................................. 117/75,
117/72, 117/124 F, 117/132 BS, 161/206, 161/207
[51] Int. Cl............................................. B44d 1/14,
B32b 15/08, B32b 25/20
[50] Field of Search............................................. 117/126
GS, 72, 75, 124 F, 132 BS; 161/206, 207

[56] References Cited
UNITED STATES PATENTS

| 2,902,389 | 9/1959 | Keil............................... | 117/72 |
| 2,946,701 | 7/1960 | Plueddemann............... | 117/126 (GSN) |
| 3,088,847 | 5/1963 | Pines............................. | 117/75 |
| 3,498,824 | 3/1970 | Chadha......................... | 117/72 |

Primary Examiner—William D. Martin
Assistant Examiner—Ralph Husack
Attorney—Marion D. Ford ABSTRACT: A silicone rubber coated substrate and method for preparing the same which comprises treating a substrate with a primer solution containing an $\omega$-amino-organosilane and thereafter coating the primed substrate with a room-temperature-curable organopolysiloxane composition containing a silane compound having both an oxirane ring and a hydrolyzable group on the silane molecule. The silane compound will react with the primer composition and also act as a curing agent for the organopolysiloxane composition to provide an adhesive bond between the silicone rubber and the substrate.

SILICONE RUBBER COATED SUBSTRATES AND A METHOD FOR BONDING SILICONE RUBBER THERETO

The present invention relates to a silicone rubber coated substrate, particularly to a room-temperature-curable silicone rubber coated substrate and more particularly to a method for bonding a room-temperature-curable silicone rubber to a substrate.

It is known that silicone rubbers have outstanding properties which make them desirable for many industrial applications; however, they are extremely difficult to bond to various substrates, particularly metal substrates. Although several primers and adhesive compositions have been used as bonding agents for heat curable silicone rubbers, these primers and adhesive compositions have been ineffective for bonding room-temperature-curable silicone rubbers to various substrates. Although other adhesive materials have been used for room-temperature-curable silicone rubbers, they have not produced thermally stable bonds.

In addition, the byproduct resulting from the curing of room-temperature-curable silicone rubbers will often cause corrosion between the rubber and the substrate, thereby destroying the bond therebetween.

It is therefore an object of this invention to provide room-temperature-curable organopolysiloxane compositions which will bond to various substrates. Another object of this invention is to provide a room-temperature-curable composition having as one of its components a compound which will chemically bond with the substrate primer and also act as a curing agent for the organopolysiloxane composition. A further object of this invention is to provide a method for bonding a curable organopolysiloxane to a substrate.

The foregoing objects and others which will become apparent from the following discussion are accomplished in accordance with this invention, generally speaking, by providing a silicone rubber coated substrate in which the curing agent for the organopolysiloxane composition is chemically linked to a primer composition on the substrate.

More specifically, this invention relates to a method for bonding room-temperature-curable organopolysiloxanes to a substrate which comprises first depositing a solution of an ω-amino-organosilane primer on the substrate and thereafter applying a curable organopolysiloxane composition thereto. The curable organopolysiloxane contains a conventional organopolysiloxane, a silane compound containing both an oxirane ring and a hydrolyzable group, as a curing agent, and a catalyst.

The ω-amino-organosilanes used as primers in this invention may be represented by the formula:

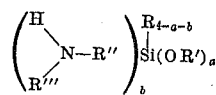

wherein R is a monovalent hydrocarbon radical, halogenated monovalent hydrocarbon radical, or cyanoalkyl radical; R' is a hydrocarbon radical; R'' is a divalent hydrocarbon radical having from two to 10 carbon atoms; R''' is a hydrogen or an alkyl group having from one to 10 carbon atoms; $a$ is a number of from two to three, and $b$ is a number of from one to two. Examples of suitable hydrocarbon radicals represented by R' above are alkyl radicals having from one to 10 carbon atoms, such as methyl, ethyl, propyl, butyl, hexyl, octyl, decyl; and aryl radicals, such as phenyl. Examples of divalent hydrocarbon radicals represented by R'' above are alkylene radicals, such as ethylene, trimethylene, tetramethylene, hexamethylene, octamethylene, decamethylene; and arylene radicals, such as phenylene and the like. Examples of suitable ω-amino-organosilanes are γ-aminopropyltriethoxysilane, γ-aminopropyltripropoxysilane, γ-aminoisobutyltriethoxysilane, γ-aminopropylmethyldiethoxysilane, γ-aminopropylethyldiethoxysilane, γ-aminopropylphenyldiethoxysilane, ω-aminobutylmethyldiethoxysilane, ω-aminobutyltriethoxysilane, and the like.

In applying the ω-amino-organosilanes to the substrate, it is preferred that they be diluted to a concentration of from about 1 to 20 percent, preferably from about 2 to 15 percent and more preferably from about 5 to 8 percent, based on the total weight of the solution. Generally speaking, the ω-amino-organosilanes are dissolved in an inert solvent and then applied to the substrate. Examples of suitable hydrocarbon solvents are benzene, toluene, xylene, and the like; halogenated hydrocarbon solvents, such as perchloroethylene or chlorobenzene; organic ethers, such as diethyl ether, dibutyl ether, and the like. It is preferred that the solvents be of sufficient volatility to vaporize off at a very low temperature.

The fluid organopolysiloxanes, preferably hydroxyl-terminated organopolysiloxanes, used in the practice of the present invention may be represented by the general formula:

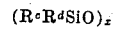

wherein $R^c$ and $R^d$, which may be the same or different, represent monovalent hydrocarbon radicals, halogenated monovalent hydrocarbon radicals, or cyanoalkyl radicals; and $x$ is an integer of from one to 20,000.

In the above formula, $R^c$ and $R^d$ are selected from the class consisting of alkyl radicals having from one to eight carbon atoms, such as methyl, ethyl, butyl, hexyl, octyl; aryl radicals, such as phenyl, diphenyl, and the like; alkaryl radicals, such as tolyl, xylyl, ethylphenyl, and the like; aralkyl radicals, such as benzyl, phenethyl, and the like; haloaryl radicals, such as chlorophenyl, tetrachlorophenyl, difluorophenyl, and the like.

The hydroxyl-terminated organopolysiloxanes are characterized by viscosities at 25°C. of from about 100 c.p.s. up to about 2,000,000 c.p.s. and preferably from about 1,000 to about 50,000 c.p.s. For the most part, such organopolysiloxanes will vary from pourable liquids to viscous fluids which will slowly flow when poured. Such organopolysiloxanes are further characterized by an organic group to silicon atom content of from about 1.95 to 2.1 and contain one hydroxyl group bonded to each of the terminal silicon atoms of the polymer chains.

The room-temperature-curable compositions of this invention contain hydroxyl-terminated organopolysiloxanes, silane curing agents which contain both an epoxy group and a functional group which is hydrolyzable at ambient moisture, and organometallic catalysts. Silanes which may be used as curing agents in the organopolysiloxane compositions of this invention and which react with the ω-amino-organosilane primers may be represented by the formula:

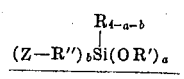

wherein R, R', R'', $a$, and $b$ are the same as those represented above; and Z represents vicinal carbon atoms having an oxirane oxygen attached. The groups represented by Z above may be further illustrated by the formula:

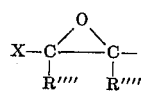

in which R'''' is a hydrogen or hydrocarbon radical; X represents hydrogen or a monovalent radical composed of a single carbon atom or a group of carbon atoms interconnected by single or multiple bonds which have additional groups, such as hydrogen, alkyl, hydroxyl, alkoxy, amino, cyclic hydrocarbon groups, or combinations thereof, attached thereto. X can also contain one or more oxirane oxygen atoms attached to vicinal carbon atoms. In addition, X can represent alkoxy or alkyl groups or groups of carbon atoms connected by ether linkages. When the R''' (s) are taken together with the vicinal carbon atoms, they can represent a cyclic group, such as a cyclohexane ring or a cyclopentane ring substituted or unsubstituted with other groups, e.g., alkyl, aryl substituents, and the like. Thus, the epoxy-containing silicone compounds may be selected from the class consisting of mono-epoxides and poly-epoxides, particularly mono-epoxides, di-epoxides, and tri-epoxides or mixtures thereof.

Representative of the epoxy-containing silanes defined above are the aliphatic, cyclo-aliphatic, aliphatic-substituted aromatic, and cyclo-aliphatic-substituted aromatic, mono-epoxysilanes and poly-epoxysilanes, such as γ-glycidoxypropyltriethoxysilane, 4,5-epoxypentatriethoxysilane, γ-glycidoxypropyltripropoxysilane, γ-glycidoxypropyltributoxysilane, ω-glycidoxyhexyltriethoxysilane, ω-glycidoxyoctyltriethoxysilane, ω-glycidoxyhexyltributoxysilane, glycidoxy-o,p-phenyltriethoxysilane, 5,6-epoxyhexyltrimethoxysilane, 5,6-epoxyhexyltributoxysilane, 5,6-epoxyhexyldiethoxymethylsilane, 7,8-epoxyoctyltrimethoxysilane, 7,8-epoxyoctyltripropoxysilane, 7,8-epoxyoctyltriethoxysilane, 9,10-epoxydecyltrimethoxysilane, 9,10-epoxydecyltripropoxysilane, 9,10-epoxydecyltriethoxysilane, and the like.

The amount of epoxy-containing carbonoxysilanes should range from about 0.5 to about 15 percent, preferably from about 1 to 10 percent and more preferably from about 3 to 8 percent, by weight based on the weight of the organopolysiloxane. If the silanes are below about 0.5 percent based on the weight of the organopolysiloxane, very little cross-linking occurs. If, on the other hand, the total weight of the silanes is above about 15 percent, then the curing time will not be substantially reduced.

As mentioned heretofore, the organopolysiloxane compositions are cured by mixing hydroxyl-terminated organopolysiloxanes with epoxy-containing carbonoxysilanes in the presence of a curing catalyst. Examples of suitable catalysts are the organometallics, preferably metal salts of carboxylic acids, such as lead, tin, zirconium, iron, cadmium, titanium, calcium, and manganese carboxylic acid salts. It is preferred that the carboxylic acid radical contain less than 14 carbon atoms and more preferably from three to 14 carbon atoms. Also, it is preferred that the salt be soluble in the organopolysiloxanes, although insoluble salts may be employed if they are properly dispersed in the system. Examples of metal salts of carboxylic acids which are operative are the naphthenates, propenates, butyrates, hexanates, oleates, benzoates, laurates, linoleates, stearates, and octoates of the above metals. Also, tin compounds, such as dibutyltin butoxychloride, bis(acetoxybutylphenyltin) oxide, bis(acetoxydibutyltin) oxide, bis(dimethyloctyltin) oxide, bis(tribenzyltin) oxide, bis(tributyltin) oxide, benzylbutylphenyltin hydroxide, di-t-butylchlorotin hydroxide, and the like, may also be used as curing catalysts.

The above catalysts may be dispersed in an inert solvent and then added to the organopolysiloxane composition or they may be dispersed on a filler and thereafter milled with the organopolysiloxane. Examples of suitable hydrocarbon solvents are benzene, toluene, xylene, and the like; halogenated hydrocarbon solvents, such as perchloroethylene or chlorobenzene; organic ethers, such as diethyl ether, dibutyl ether, and the like or fluid hydroxyl-free polysiloxanes. It is preferred that the solvents be of sufficient volatility to vaporize off at a very low temperature.

The catalysts used in these curing systems are effective in minimal amounts, e.g., from about 0.05 to about 2 percent, preferably from about 0.1 to about 1 percent by weight based on the weight of the composition. A mixture of two or more of the catalysts may be used, if desired.

Although it is not essential, often times it is desirable to incorporate fillers in the organopolysiloxane compositions in order to impart desirable physical properties. Examples of suitable fillers are fumed silicas, high-surface-area precipitated silicas, silica aerogels, as well as coarse silicas, such as diatomaceous earth, crushed quartz, and the like. Other fillers may be used, such as titanium dioxide, ferric oxide, zinc oxide, and fibrous fillers, such as asbestos, fibrous glass, and the like. Other additives, such as pigments, antioxidants, ultraviolet absorbents, and the like may also be included.

The organopolysiloxane compositions may be compounded in the usual manner for preparing conventional siloxane elastomers; however, before the materials are stored prior to use, it is essential that the catalyst or epoxy-containing carbonoxysilane curing agent be stored separately. In other words, the hydroxyl-terminated organopolysiloxane, curing agent, and filler, where desired, may be compounded and the catalyst added just prior to use. In another embodiment, the organopolysiloxane, catalyst, and filler may be compounded and then the curing agent added just prior to use. Where an inert filler is used, it may be added either to the organopolysiloxane or the curing agent prior to the addition of the catalyst or immediately after the reactants have been combined.

Before applying a modified organopolysiloxane composition, it is necessary to first coat the substrate with a dilute solution of an ω-amino-organosilane in order to obtain satisfactory bonding to the substrate. Generally, the ω-amino-organosilane is applied as a solution containing from 1 to 20 percent by weight based on the weight of the solution. Especially good results have been achieved at these concentrations using γ-aminopropyltriethoxysilane in toluene. The amino-organosilane may be applied in any suitable manner, including brushing, dipping, and spraying, and dried before the application of the organopolysiloxane.

The organopolysiloxane composition containing a catalyst and a curing agent and a filler, if desired, is applied over the coated substrate and allowed to cure in the presence of ambient moisture.

The method of this invention may be employed to produce a wide range of products including silicone rubber coated metals for use as duct work in airplanes and as damping devices in sonar equipment. In addition, metals may be coated, laminated, and bonded together with silicone rubber by means of this invention.

The embodiments of this invention are further illustrated by the following examples in which all parts are by weight unless otherwise specified.

EXAMPLE 1

Solutions containing from 2 to 50 percent by weight of γ-aminopropyltrimethoxysilane are prepared by mixing varying amounts of γ-aminopropyltrimethoxysilane with toluene. The solutions are brushed on previously cleaned and degreased metal substrates and dried.

A curable silicone rubber composition prepared by mixing about 5 parts of γ-glycidoxypropyltrimethoxysilane and about 0.5 parts of stannous octoate with about 100 parts of a hydroxyl-terminated polydimethylsiloxane having a viscosity of about 1,500 c.p.s. is applied to the primed metal substrates and cured at room temperature for 7 days.

In a similar example, a curable silicone rubber composition prepared in accordance with the procedure described above is applied to untreated metal substrates and cured for a similar period of time. The results of these tests are illustrated in table I.

TABLE I.—SILICONE RUBBER ADHESION

| Ex. No. | Primer,[1] percent | Substrate | | | | | | | |
|---|---|---|---|---|---|---|---|---|---|
| | | Cd steel | Stainless steel | Sn | Cu | Al | Glass | Ti | Mg |
| 1(a) | 0 | N | N | N | N | N | F | N | N |
| 1(b) | 2 | G | G | G | G | G | E | G | G |
| 1(c) | 5 | E | E | E | E | E | E | E | E |
| 1(d) | 10 | G | G | G | G | G | E | G | G |
| 1(e) | 15 | F | F | F | F | F | G | F | F |
| 1(f) | 20 | P | P | P | P | P | G | P | P |
| 1(g) | 50 | P | P | P | P | P | G | P | P |

[1] Aminopropyltrimethoxysilane plus toluene.

NOTE.—Cd=cadmium; Sn=tin; Cu=copper; Al=aluminum; Ti=titanium; Mg=magnesium. Adhesion test.—E=excellent; G=good; F=fair; P=poor; N=none.

As illustrated in table I. the silicone rubber exhibited good adhesion to metal substrates primed with a solution containing from 2 to about 20 percent of γ-aminopropyltrimethoxysilane. However, the silicone rubber did not adhere to substrates primed with a 50 percent γ-aminopropyltrimethoxysilane, nor did it adhere to untreated metal substrates.

EXAMPLE 2

A solution containing 5 parts of γ-aminopropyltriethoxysilane in 95 parts of toluene is applied to previously cleaned and degreased substrates and dried at ambient temperature.

A curable silicone rubber composition prepared by mixing varying amounts of γ-glycidoxypropyltrimethoxysilane and about 0.5 parts of stannous octoate to about 100 parts of hydroxyl-terminated polydimethylsiloxane having a viscosity of about 1,500 c.p.s. is applied to the coated substrates and cured at room temperature for 7 days. The cohesive and adhesive test results are illustrated in table II.

TABLE II

| Ex. No. | Curing agent,[1] parts | Stainless steel | Tin | Copper | Aluminum | Glass |
|---|---|---|---|---|---|---|
| 2(a) | 2 | C | C | C | A | C |
| 2(b) | 5 | C | C | C | C | C |
| 2(c) | 7 | C | C | C | C | C |
| 2(d) | 10 | C | C | C | C | C |

[1] Glycidoxypropyltrimethoxysilane.

NOTE.—A=adhesive failure; C=cohesive failure.

EXAMPLE 3

A curable silicone rubber composition is prepared by mixing about 7 parts of γ-aminopropyltripropoxysilane and about 0.5 parts of dibutyltin dilaurate with about 100 parts of hydroxyl-terminated polydimethylsiloxane having a viscosity of about 2,000 c.p.s. and applied to a stainless steel substrate previously coated with γ-aminopropyltriethoxysilane. The silicone rubber composition is cured in the presence of ambient moisture at room temperature for 7 days. The composition exhibited excellent adhesion to the primed substrate.

EXAMPLE 4

In accordance with the procedure described in example 3, a curable silicone rubber composition containing 7 parts of 9,10-epoxydecyltriethoxysilane and about 0.5 parts of dibutyltin butoxychloride in about 100 parts of a hydroxyl-terminated polydimethylsiloxane having a viscosity of about 2,000 c.p.s. is applied to a primed stainless steel substrate and cured at room temperature for 7 days. The silicone rubber composition exhibited excellent adhesion.

EXAMPLE 5

In accordance with the procedure described in example 3, a silicone rubber composition is prepared by mixing about 6 parts of 5,6-epoxyhexyltripropoxysilane, about 70 parts of iron oxide, and about 0.5 parts of dibutyltin dilaurate with about 100 parts of a hydroxyl-terminated polydimethylsiloxane having a viscosity of about 2,000 c.p.s. and applied to a stainless steel substrate previously coated with a 5 percent solution by weight of γ-aminopropyltriphenoxysilane. After curing at room temperature for 7 days, the silicone rubber composition exhibited excellent adhesion.

When other amino-organosilanes, such as γ-aminopropyltripropoxysilane, ω-aminoisobutyltriethoxysilane, and sec-aminoalkyl-alkoxysilanes, such as N-methyl-γ-aminopropyltriethoxysilane, N-phenyl-γ-aminoisobutyltriethoxysilane, N-γ-aminopropyl-γ-aminopropyltriethoxysilane, are substituted for γ-aminopropyltriethoxysilanes in these examples, similar results are obtained. Also, when the above examples are repeated utilizing other epoxy-containing carbonoxysilanes as curing agents, silicone rubber compositions are obtained which have desirable physical properties and also exhibit good adhesion to metal substrate.

Although specific examples of the invention have been described herein, it is not intended to limit the invention solely thereto, but to include all the variations and modifications falling within the spirit and scope of the appended claims.

The invention claimed is:

1. An article of manufacture comprising a metal or glass substrate, a room-temperature cured organopolysiloxane composition bonded to said substrate, said composition containing a curing catalyst and at least 0.5 percent by weight based on the weight of the organopolysiloxane of a silane curing agent having both an oxirane ring and a hydrolyzable group on the silane molecule, and an ω-amino-organosilane having the formula:

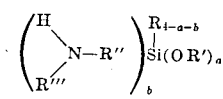

interposed between the substrate and the cured organopolysiloxane, wherein R is selected from the class consisting of monovalent hydrocarbon radicals, halogenated monovalent hydrocarbon radicals, and cyanoalkyl radicals; R' is selected from the class consisting of alkyl groups and aryl groups; R'' is selected from the class consisting of alkylene groups having from two to 10 carbon atoms and arylene groups; R''' is selected from the group consisting of hydrogen and alkyl groups; $a$ is a number of from two to three; and $b$ is a number of from one to two.

2. The article of claim 1 wherein the organopolysiloxane may be represented by the general formula:

in which $R^c$ and $R^d$ are selected from the group consisting of monovalent hydrocarbon radicals, halogenated monovalent hydrocarbon radicals, and cyanoalkyl radicals; and $x$ is a number of from one to 20,000.

3. The article of claim 1 wherein the ω-amino-organosilane is a ω-aminoalkylenetrialkoxysilane.

4. The article of claim 1 wherein the curing agent is a ω-epoxyalkylenetrialkoxysilane.

5. The article of claim 4 wherein the curing agent is γ-glycidoxy-propyltrimethoxysilane.

6. A method for bonding a room temperature curable organopolysiloxane to a metal or glass substrate which comprises coating the substrate with an inert solvent solution containing from 2 to 20 percent by weight of a ω-amino-organosilane of the formula:

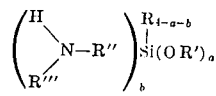

wherein R is selected from the class consisting of monovalent hydrocarbon radicals, halogenated monovalent hydrocarbon radicals, and cyanoalkyl radicals; R' is selected from the class consisting of alkyl groups and aryl groups; R'' is selected from the class consisting of alkylene groups having from two to 10 carbon atoms and arylene groups; R''' is selected from the group consisting of hydrogen and alkyl groups; $a$ is a number of from two to three; and $b$ is a number of from one to two; drying the coated substrate; applying to the coated substrate a room temperature curable organopolysiloxane composition containing a curing catalyst and at least 0.5 percent by weight based on the weight of the organopolysiloxane of a silane curing agent having both an oxirane ring and a hydrolyzable group on the silane molecule and thereafter curing the organopolysiloxane composition in ambient moisture.

7. The method of claim 6 wherein the solution is an inert hydrocarbon solvent solution.

8. The method of claim 6 wherein the amino-organosilane is ω-aminoalkylenetrialkoxysilane.

9. The method of claim 6 wherein the silane curing agent is γ-glycidoxypropyltrimethoxysilane.